Oct. 8, 1940. K. J. JENSEN Re. 21,596

MACHINE AND METHOD FOR TWISTING METAL WIRES

Original Filed March 3, 1934

INVENTOR
KARL JOHAN JENSEN
BY Chas. H. Lane
ATTORNEY

Reissued Oct. 8, 1940

Re. 21,596

UNITED STATES PATENT OFFICE 21,596

MACHINE AND METHOD FOR TWISTING METAL WIRES

Karl Johan Jensen, Nydalen, v. Aker, near Oslo, Norway, assignor, by mesne assignments, to Screw Nail Corporation of America, Wilmington, Del., a corporation of Delaware Original No. 1,998,582, dated April 23, 1935, Serial No. 713,871, March 3, 1934. Application for reissue May 12, 1937, Serial No. 142,304. In Germany December 22, 1933

7 Claims. (Cl. 153—78)

Figure 1:
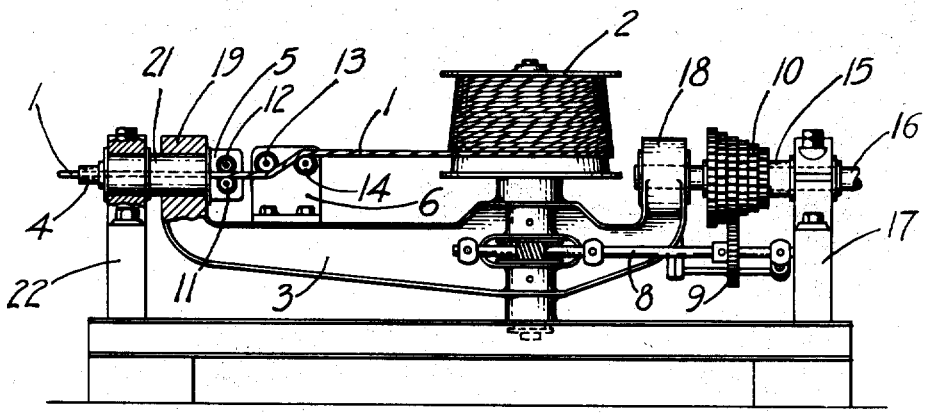

The present invention relates to machines for continually twisting a profile wire about its axis in order to obtain a helically twisted single profile wire adapted for use in the manufacture of helical nails or the like. The term "profile wire" as used herein means a non-circular wire having an angular cross section such as square, rectangular, triangular or other angular shape.

Machines of this type generally comprise two drums for taking up the untwisted and the twisted wire respectively, the axes of said drums being adapted to perform a rotative movement relative to each other preferably in parallel planes.

In passing from one drum to the other the wire to be twisted is held between guiding rollers, which are stationary relative to the drum from which the wire is unwound, and the twisting of the wire accordingly takes place between these guiding rollers and the second drum, on to which the wire is wound.

It has been found in practice that it is very important in order to obtain a satisfactory effect by the use of helically wound nails that the pitch of the helical twisting be substantially uniform and be maintained within certain definite limits varying with the thickness of the profile wire used.

In prior machines of the kind specified it is not possible to obtain a uniform pitch along the length of the wire to be twisted, as hard wires of the kind adapted for use in the manufacture of nails have a varying degree of resistance to torque along their length, and when the twisting takes place over a considerable length of wire, such as is the case in machines of the type specified, the softer parts of the wire when appearing between the guiding rollers and the receiving drum will be twisted with a shorter pitch than the harder parts of the wire.

In order to avoid this drawback the twisting of the wire in accordance with the present invention is done by means of a pair of stationary guiding or gripping rolls, or equivalent gripping means which grip the wire and prevent its rotation but permit its forward travel. Spaced from these rolls, a drum is arranged winding up the twisted wire. Between this drum and the guiding rolls a pair of grooved bending or deflecting rolls is arranged in spaced relation, the wire 1 passing beneath one roller and over the other so that the wire is deflected at an acute angle. The wire has to pass these rolls on its way from the guiding rolls to the drum and is deflected by these rolls at an acute angle. By rotating the drum around its own axis and, furthermore, both the drum and the pair of the grooved rolls around another axis lying substantially in the direction of the path of the wire between the guiding rolls, the wire is twisted while frictionally engaging one of the rolls of the roller-pair which lies on the side of the guiding rolls.

By this arrangement the twisting of the wire takes place on a relatively very short length of wire, whereby the risk of having wire with different hardness exposed to twisting torque at the same time is considerably reduced.

In accordance with the invention a said set of bending or deflecting rollers comprises two or more rollers placed a certain distance apart and so located with regard to each other and with regard to the longitudinal axis of the wire that the latter in passing the rollers follows the circumference thereof over a certain arc, whereby a bending of the wire takes place around the particular roller so that the wire is deflected at an acute angle. The rollers are provided with smoothly curved guiding grooves in order to permit the wire to rotate around its axis relatively to the roller.

The set of rollers over which the wire is bent will exert a certain torque on the wire, and as this torque will depend on the friction between roller and wire, the torque exerted by the rollers will be in proportion to the hardness of the particular part of the wire under treatment, owing to the fact that the elastic resistance of the wire against being bent over the rollers will be in proportion to the hardness of the particular part of wire under treatment.

In this manner the twisting torque exerted on the wire will be in proportion to the resistance of the wire against being bent or deflected, whereby a substantially uniform twisting pitch is obtained in the finished product irrespective of the variation in hardness along the length of the wire.

Figure 2:
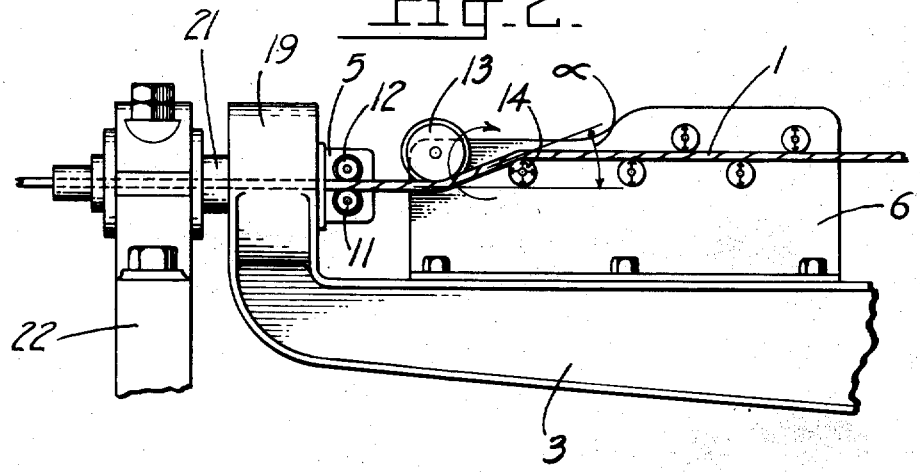

Further features of the invention will be apparent from the following specification with reference to the drawing, of which:

Fig. 1 is a side view of a machine in which one form of the invention is embodied, whereas Fig. 2 is a side view on a larger scale of a modified form of twisting rollers.

Referring to Figure 1 the profile wire 1 is unwound from a drum having a stationary axis (not shown on the drawing). The twisted wire is wound on to a drum 2, which is rotatably mounted on the frame or yoke 3, which is adapted to rotate around an axis perpendicular to the axis of the drum.

The profile wire 1 passes thru the stationary hollow trunnion 4 and between guiding or gripping rollers 11, 12 mounted on stationary block 5, which are adapted to grip the profile wire securely between them to prevent its rotation at that point but permit its forward travel. At a short distance from rollers 11, 12 the profile wire 1 passes between a second set of bending rollers 13, 14 carried by the support 6 which is secured to the rotating frame 3, and substantially all twisting of the wire (in the direction of the arrow shown in Fig. 2) takes place on the short stretch between gripping rollers 11—12 on stationary block 5 and deflecting roller 13 on supporting bracket 6 which revolves with frame 3.

In order to secure a uniform feeding of the wire the same is wound on one end of the conical drum 2, well known in the art, the several windings slipping gradually along the conical surface of the drum.

In order to be able to control the pitch of the twisting, the rotation of drum 2 is derived from a countershaft 8, which is adapted to be brought into engagement with any one of a number of stationary gears 10 during the rotation of the frame 3.

By using gear wheels 9 of different diameter adapted to mesh with any selected gear 10, the ratio of rotation of drum 2 and frame 3 may be varied in order to vary the pitch of the twist.

In accordance with one form of the invention the set of guiding or gripping rollers carried by the stationary block 5, shown in Fig. 2, comprises the rollers 11, 12, having profile grooves adapted to grip the wire securely between them. The second set of rollers carried by the support 6 however comprises two rollers 13, 14, which are mounted at a certain distance from each other and around which the wire is bent at certain angles, so that the wire will be in contact with each roller for a certain definite arc of its circumference.

As it is to be seen from the drawing, the wire is deflected from its horizontal path in an acute angle L, being considerably smaller than 90° and should preferably not exceed 40–50°. It results in that the wire may rotate relatively to the roll 13, while passing it, and thereby the following advantage is obtained. The resistance of the wire to bending increases with its hardness and, consequently, the force for bending the wire exercised by the drum 2 while rotating around its own axis automatically increases correspondingly. Thereby the friction is increased between the harder wire and the roll and thereby the resistance to rotation of the wire on the grooved periphery of the roll 13. Because of the fact that the drum 2 rotates also around another axis arranged about perpendicularly to its own axis and lying in the direction of the horizontal path of the wire between the guiding rolls 11, 12 mounted on the fixed bracket 5, the mechanism for rotating the drum 2 around the second horizontal axis automatically and momentarily increases the degree of torsion corresponding to the increased resistance to torsion. Thereby the advantage is secured that the twisting torque becomes indeed directly proportionate to the hardness of the wire.

The grooves of said rollers 13, 14 should preferably have a smooth curved cross section so as to permit the wire to slip in the grooves about the axis of the wire.

As explained above this arrangement of bending rollers 13, 14 will have the effect of exerting an increased torque on the wire when hard parts of the wire arrive between the rollers, as these hard parts of wire will be pressed more strongly against the rollers owing to being bent partly about them than will be the case with soft parts of wire.

The rolls 13, 14 may preferably be adapted to be adjusted to different positions with regard to the other roller and the horizontal path of the wire.

Although the second set of rollers as illustrated on the drawing comprises only two rollers 13, 14, three or more rollers may be used in some cases.

With reference to Fig. 1, the group of six gears 10 of different diameter are fixed on sleeve 15 which surrounds shaft 16. The sleeve 15 in turn is fixedly secured to the right hand standard 17. The frame 3 by means of its right hand bearing 18 is keyed to shaft 16 and is driven by means of said shaft 16, which in turn is connected with any suitable source of power not shown. The left hand bearing 19 of the frame or yoke 3 revolves upon sleeve 21 which is fixedly secured to left hand standard 22. Fig. 1 is a front side view of the machine and the lower frame is the front frame, there being of course a parallel rear frame (not shown) with sufficient space between the front and rear frames to give clearance to the revolving yoke 3 and the shaft of drum 2. The shaft of drum 2 is shown in Fig. 1 when it assumes a vertical position in its bodily rotation with the yoke 3 and when in this position it is centrally of the front and rear frames and the lowermost part of the drum shaft is hidden from view when looking from the front on a level with the lower front frame.

While I have preferably illustrated a set of rolls for holding the wire against rotation and another set of rolls for bending the wire other equivalent means may be substituted for the purpose of carrying out my method without departing from the spirit, scope and principle of my invention.

I claim:

1. In a machine for continuously twisting wire, a pair of stationary guiding rolls which grip the wire and prevent its rotation, a drum spaced from said guiding rolls and being adapted to wind up the twisted wire, a pair of grooved rolls located between said guiding rolls and said drum and arranged in spaced relation to each other to have the wire pass beneath one roll at one level and over the other at another level, so that the wire is deflected at an acute angle to its previous path of travel, said angle being maintained at such a degree below ninety degrees as will permit slipping of the wire on said deflecting means and above a minimum degree as will impart an operative bend to said wire, and means for rotating said drum around its own axis and both said drum and pair of grooved rolls around another axis lying substantially in the direction of the path of the wire between said guiding rolls.

2. In a machine for continuously twisting wire, a pair of stationary guiding rolls gripping the wire and preventing its rotation, a drum spaced from said guiding rolls and being adapted to wind up the twisted wire, means for rotating said drum around its own axis, a pair of rolls having circumferential guiding grooves of smoothly curved cross section to grip the wire without preventing its rotation and being located between said guiding rolls and said drum and arranged in spaced relation to each other to have the wire pass beneath one roll at one level and over the other at another level, so that the wire is deflected at an acute angle to its previous path of travel, said angle being maintained at such a degree below ninety degrees as will permit slipping of the wire on said deflecting means and above a minimum degree as will impart an operative bend to said wire, and means for bodily rotating said pair of rolls and said drum around an axis lying substantially in the direction of the path of the wire between the stationary guiding rolls.

3. In a machine for continuously twisting wire, a pair of stationary guiding rolls gripping the wire and preventing its rotation, a drum spaced from said guiding rolls and being adapted to wind up the twisted wire, means for rotating said drum around its own axis, a pair of rolls having circumferential guiding grooves of smoothly curved cross section to grip the wire without preventing its rotation and being located between said guiding rolls and said drum and arranged in spaced relation to each other to have the wire pass beneath one roll at one level and over the other at another level, so that the wire is deflected at an acute angle to its previous path of travel, said angle being maintained at such a degree below ninety degrees as will permit slipping of the wire on said deflecting means and above a minimum degree as will impart an operative bend to said wire, so that the varying frictional engagement between deflecting roll and wire due to varying degrees of hardness of wire sections produces a uniform twist, and means for bodily rotating said pair of rolls and said drum around an axis lying substantially in the direction of the path of the wire between the stationary guiding rolls.

4. In a machine for continuously twisting wire, a pair of stationary guiding rolls gripping the wire and preventing its rotation, a drum spaced from said guiding rolls and being adapted to wind up the twisted wire, means for rotating said drum around its own axis, a pair of rolls having circumferential guiding grooves of smoothly curved cross section adapted to grip the wire without preventing its rotation and being located between said guiding rolls and said drum and arranged in spaced relation to each other to have the wire pass beneath one roll at one level and over the other at another level, so that the wire is bent at an angle of less than 50 degrees, and means for bodily rotating said pair of rolls and said drum around an axis lying substantially in the direction of the path of the wire between the stationary guiding rolls.

5. In a machine for twisting metal wire into threaded wire of substantially uniform pitch irrespective of the non-uniform hardness of the wire, comprising in combination, means for gripping said wire to prevent its rotation while traveling through said gripping means, deflecting means spaced from said first means for bending said wire at an acute angle from its previous path of travel, said acute angle being maintained at such a degree below ninety degrees as will permit slipping of the wire on said deflecting means and above a minimum degree as will impart an operative bend to said wire, means for feeding said wire past both of said gripping and deflecting means and means for rotating said deflecting means in timed relation with said feeding means.

6. The method of twisting metal wire into threaded wire of substantially uniform pitch irrespective of any non-uniform hardness of the wire, which consists in automatically feeding a metal wire of angular cross section in a substantially straight line of travel, holding said wire against axial rotation at one point of its travel, bending said wire at an acute angle from its previous path of travel at another point of its travel, frictionally engaging it against the bending means constantly maintaining said acute angle at such a degree below ninety degrees as will permit slipping of the wire on said bending means and above a minimum degree as will impart an operative bend to said wire, rotating said bending means at a speed whose ratio to the speed of wire feeding is constant to axially twist said wire, whereby the varying resistance to said bending and the varying friction against said bending means offered by non-uniform hard sections produces a threaded wire of substantially uniform pitch.

7. The method of twisting metal wire into threaded wire of substantially uniform pitch irrespective of any hard and soft sections of said wire which consists in automatically feeding a metal wire of angular cross section in a substantially straight line of travel, holding said wire against axial rotation at one point of its travel, feeding said wire past a deflecting means, thereby bending it at an acute angle from its previous path of travel, constantly maintaining said acute angle at such a degree below ninety degrees as will permit slipping of the wire on said deflecting means and above a minimum degree as will impart an operative bend to said wire, rotating said deflecting means at a speed whose ratio to the speed of wire feeding is constant to axially twist said wire while it engages said deflecting means, whereby the varying resistance to said bending and the varying friction against said deflecting means offered by non-uniform hard sections produces a threaded wire of substantially uniform pitch.

KARL JOHAN JENSEN.